US012523348B1

(12) United States Patent
Chang

(10) Patent No.: US 12,523,348 B1
(45) Date of Patent: Jan. 13, 2026

(54) DOG-SHAPED ATMOSPHERE LAMP

(71) Applicant: Shenzhen Bow Technology Co., Ltd

(72) Inventor: Yu-Chuan Chang, Shenzhen (CN)

(73) Assignee: SHENZHEN BOW TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 19/311,953

(22) Filed: Aug. 27, 2025

(30) Foreign Application Priority Data

Jul. 8, 2025 (CN) ......................... 202510934528.4

(51) Int. Cl.
*F21V 23/00* (2015.01)
*F21S 9/02* (2006.01)
(Continued)

(52) U.S. Cl.
CPC .............. *F21S 9/02* (2013.01); *F21V 17/101* (2013.01); *F21V 17/12* (2013.01); *F21V 23/002* (2013.01); *F21V 23/005* (2013.01); *F21V 23/04* (2013.01); *F21V 2200/40* (2015.01); *F21Y 2107/90* (2016.08)

(58) Field of Classification Search
CPC ...... F21V 23/002; F21V 17/101; F21V 17/12; F21V 23/005; F21V 23/04; F21V 2200/40; F21V 23/06; F21V 33/0028; F21V 1/16; F21V 21/005; F21V 3/023; F21V 33/008; F21S 9/02; F21S 2/005; F21S 4/10; F21Y 2107/90; F21Y 2115/10; Y10T 29/49826; G09B 1/36; G05B 2219/40304; G05B 2219/40302; B25J 9/08; A63H 33/04; A63H 3/46; A63H 3/16; A63H 33/046; A63H 3/006; A63H 33/22; A63H 3/04; A63H 13/00; A63H 3/50; A63H 33/40; H05B 47/195; H05B 45/20; A45C 15/06; F21W 2121/00; A47G 33/06; B44F 1/06
USPC ..................... 362/121–124; 446/47, 91, 242; 428/18–20
See application file for complete search history.

(56) References Cited

U.S. PATENT DOCUMENTS

| | | | | | |
|---|---|---|---|---|---|
| 5,577,831 | A * | 11/1996 | Chang | ..................... | G09F 13/04 362/240 |
| 10,274,180 | B2 * | 4/2019 | Shine | ........................ | F21K 9/20 |

(Continued)

FOREIGN PATENT DOCUMENTS

| | | |
|---|---|---|
| CN | 207230289 U | 4/2018 |

*Primary Examiner* — Omar Rojas Cadima
(74) *Attorney, Agent, or Firm* — Muncy, Geissler, Olds & Lowe, P.C.

(57) ABSTRACT

A dog-shaped atmosphere lamp, includes a housing and a light source assembly arranged inside the housing, the light source assembly includes one or more lamp panel assemblies and light guide tubes; each of the lamp panel assemblies includes a PCB, lamp beads arranged on two sides of the PCB, and a connecting electric wire, and a white coating is provided on a surface of the PCB; the light guide tube matched with the lamp panel assembly is arranged outside each of the lamp panel assemblies; and the PCB and the connecting electric wire are located in the corresponding light guide tube. The 360-degree uniform light emission is achieved, and the PCB and the connecting electric wire are located in the corresponding light guide tube, so that the internal structure is simple, uniform scattering of a light source is achieved, and the complex appearance is combined with the beautiful appearance.

10 Claims, 7 Drawing Sheets

(51) Int. Cl.
*F21V 17/10* (2006.01)
*F21V 17/12* (2006.01)
*F21V 23/04* (2006.01)
*F21Y 107/90* (2016.01)

(56) References Cited

U.S. PATENT DOCUMENTS

2015/0104992 A1* 4/2015 Jung .................... A63H 33/108
446/91
2021/0275932 A1* 9/2021 Fink ....................... A63H 29/22

* cited by examiner

DOG-SHAPED ATMOSPHERE LAMP

TECHNICAL FIELD

The present disclosure relates to the technical field of household appliance products, in particular to a dog atmosphere lamp.

BACKGROUND

Existing transparent atmosphere lamps generally have relatively simple shapes due to the fact that the internal structures thereof are visible; and the complex appearance causes complex structures of internal shapes, which affect the attractiveness of the appearance. Thus, it is an urgent issue to address to provide a transparent atmosphere lamp with the complex appearance and shape and attractiveness.

SUMMARY

The present disclosure aims to solve the problems that existing transparent atmosphere lamps in complex shapes cannot achieve uniform illumination and beautiful appearance at the same time.

The technical solution adopted to solve the technical problems proposed by the present disclosure is as follows: a dog-shaped atmosphere lamp in the present disclosure includes a housing and a light source assembly arranged inside the housing, where the housing is a dog-shaped transparent housing; the light source assembly includes one or more lamp panel assemblies and one or more light guide tubes which are arranged inside the housing; each of the lamp panel assemblies includes a PCB, lamp beads arranged on two sides of the PCB, and a connecting electric wire, and a white coating is provided on a surface of the PCB; the light guide tube matched with the lamp panel assembly is arranged outside each of the lamp panel assemblies; and the PCB and the connecting electric wire are located in the corresponding light guide tube.

The technical solutions further defining the present disclosure include the following features:

the housing includes an integrally formed central chamber arranged corresponding to the head, neck, body and tail of a dog, an ear chamber arranged corresponding to ears of the dog, a foreleg chamber arranged corresponding to forelegs of the dog, and a hind leg chamber arranged corresponding to hind legs of the dog; and each of the lamp panel assemblies includes a main control lamp panel arranged inside the central chamber, an ear lamp panel arranged inside the ear chamber, a foreleg lamp panel arranged inside the foreleg chamber, and a hind leg lamp panel arranged inside the hind leg chamber, and the ear lamp panel, the foreleg lamp panel and the hind leg lamp panel are respectively connected to the main control lamp panel.

The ear lamp panel, the foreleg lamp panel and the hind leg lamp panel are V-shaped lamp panels, the V-shaped lamp panels are connected to the corresponding housing through connecting lamp bases, the V-shaped lamp panels and the light guide tubes corresponding to the V-shaped lamp panels are mounted on the connecting lamp bases, and the connecting lamp bases are detachably connected to the corresponding housing.

An encoder rotary switch corresponding to the nose of the dog is arranged on a wall of the central chamber, a button corresponding to the encoder rotary switch is arranged inside a head chamber, and the encoder rotary switch is clamped with the wall of the central chamber.

The dog-shaped atmosphere lamp further includes a battery, a battery compartment is arranged inside the foreleg chamber and/or the hind leg chamber, the battery is located inside the battery compartment, and a charging interface connected to the main control lamp panel is arranged on a wall of the foreleg chamber and/or a wall of the hind leg chamber.

The central chamber includes a left housing and a right housing which are vertically arranged, the left housing and the right housing are bonded through glue, the main control lamp panel is arranged along the shape of the central chamber, the left housing is provided with a left clamping groove matched with the light guide tube corresponding to the main control lamp panel, the right housing is provided with a right clamping groove matched with the light guide tube corresponding to the main control lamp panel, the light guide tube corresponding to the main control lamp panel is clamped between the left clamping groove and the right clamping groove, and the ear chamber, the foreleg chamber and the hind leg chamber are respectively inserted into the left housing and the right housing to be fixedly connected to the left housing and the right housing.

The left housing is provided with ear chamber mounting columns, foreleg chamber mounting columns, and hind leg chamber mounting columns in a horizontal direction; the left housing and the right housing are provided with an ear chamber mounting groove, a foreleg chamber mounting groove, and a hind leg chamber mounting groove; an ear chamber mounting portion matched with the ear chamber mounting groove is arranged at the bottom of the ear chamber; ear chamber mounting holes matched with the ear chamber mounting columns are provided in the ear chamber mounting portion; a foreleg chamber mounting portion matched with the foreleg chamber mounting groove is arranged at the top of the foreleg chamber; foreleg chamber mounting holes matched with the foreleg chamber mounting columns are provided in the foreleg chamber mounting portion; a hind leg chamber mounting portion matched with the hind leg chamber mounting groove is arranged at the top of the hind leg chamber; and hind leg chamber mounting holes matched with the hind leg chamber mounting columns are provided in the hind leg chamber mounting portion.

The ear chamber mounting portion is provided with an ear wire routing hole in communication with the central chamber; the foreleg chamber mounting portion is provided with a foreleg wire routing hole in communication with the bottom of the central chamber; and the hind leg chamber mounting portion is provided with a hind leg wire routing hole in communication with the bottom of the central chamber.

The ear chamber includes a front ear housing and a rear ear housing, and the front ear housing and the rear ear housing are detachably connected through screws; the foreleg chamber includes a foreleg front housing and a foreleg rear housing, and the foreleg front housing and the foreleg rear housing are connected through screws; and the hind leg chamber includes a hind leg front housing and a hind leg rear housing, and the hind leg front housing and the hind leg rear housing are connected through screws.

Each of the light guide tubes is made of a mixed material of light-transmitting plastic and optical diffusion powder, and a frosted layer is arranged on a surface of the light guide tube.

By means of the above technical solutions, the present disclosure has the beneficial effects as follows: the housing of the dog atmosphere lamp in the present disclosure is the dog-shaped transparent housing; the light source assembly includes one or more lamp panels and one or more light guide tubes which are arranged inside the housing; the lamp beads are arranged on two sides of the PCB, and the white coating is provided on the surface of the PCB; and the light guide tube matched with the lamp panel is arranged outside each of the lamp panels. The 360-degree uniform light emission is achieved, and the PCB and the connecting electric wire are located in the corresponding light guide tube, so that the internal structure is simple, uniform scattering of a light source is achieved, and the complex appearance is combined with the beautiful appearance.

Figure 1:
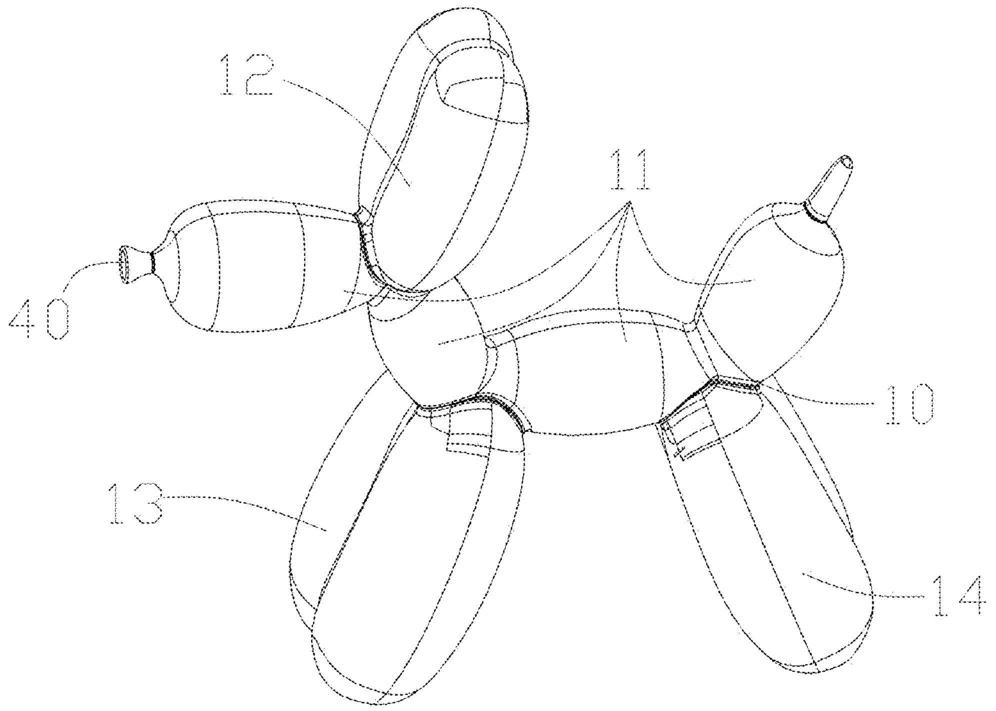
FIG. 1 is a three-dimensional structure diagram of a dog-shaped atmosphere lamp in the present disclosure.

In the drawings, housing 10, central chamber 11, left housing 111, left clamping groove 1111, ear chamber mounting column 1112, foreleg chamber mounting column 1113, hind leg chamber mounting column 1114, right housing 112, right clamping groove 1121, ear chamber mounting groove 113, foreleg chamber mounting groove 114, hind leg chamber mounting groove 115, ear chamber 12, front ear housing 1201, front ear housing positioning protrusion 12011, rear ear housing 1202, rear ear housing dispensing groove 12021, ear chamber mounting portion 121, ear chamber mounting hole 122, ear wire routing hole 123, foreleg chamber 13, foreleg front housing 1301, foreleg front housing positioning protrusion 13011, foreleg rear housing 1302, foreleg rear housing dispensing groove 13021, foreleg chamber mounting portion 131, foreleg chamber mounting hole 132, foreleg wire routing hole 133, hind leg chamber 14, hind leg front housing 1401, hind leg front housing dispensing groove 14011, hind leg rear housing 1402, hind leg rear housing positioning protrusion 14021, hind leg chamber mounting portion 141, hind leg chamber mounting hole 142, hind leg wire routing hole 143, battery compartment 15, light source assembly 20, lamp panel assembly 21, PCB 211, lamp bead 212, connecting electric wire 213, main control lamp panel 214, ear lamp panel 215, foreleg lamp panel 216, hind leg lamp panel 217, light guide tube 22, connecting lamp base 30, first lamp base housing 31, second lamp base housing 32, encoder rotary switch 40, button 50, battery 60, and charging interface 70.

DETAILED DESCRIPTION OF THE EMBODIMENTS

The structure of the present disclosure is further described in conjunction with the accompanying drawings below.

Figure 2:
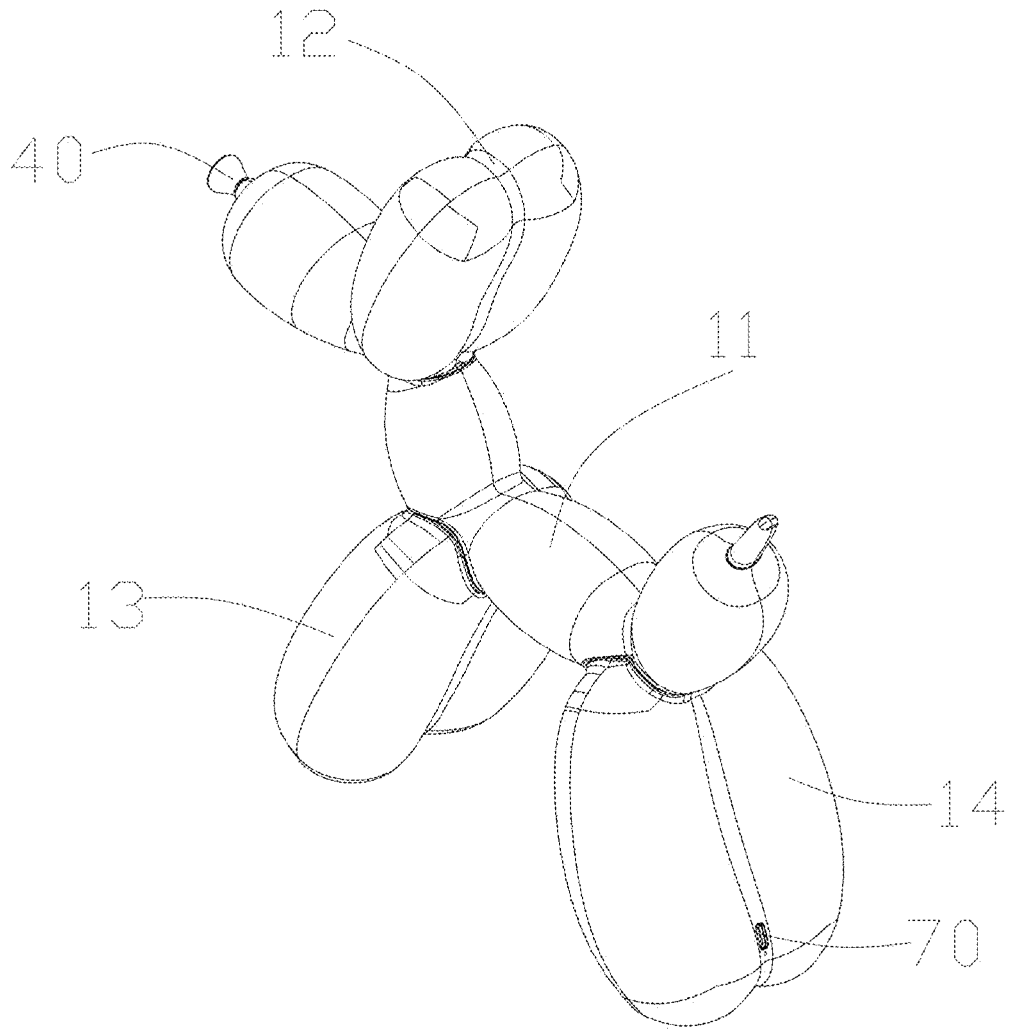
FIG. 2 is a three-dimensional structure diagram of a dog-shaped atmosphere lamp in the present disclosure.
Figure 3:
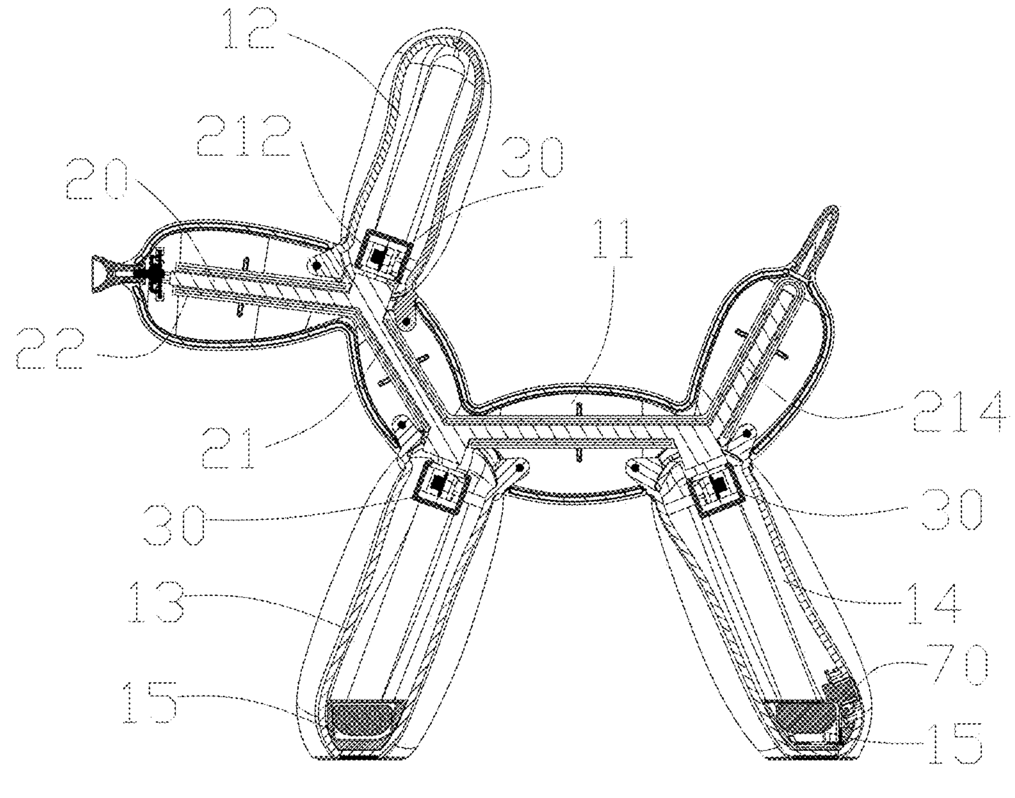
FIG. 3 is a sectional structure diagram of a dog-shaped atmosphere lamp in the present disclosure.
Figure 4:
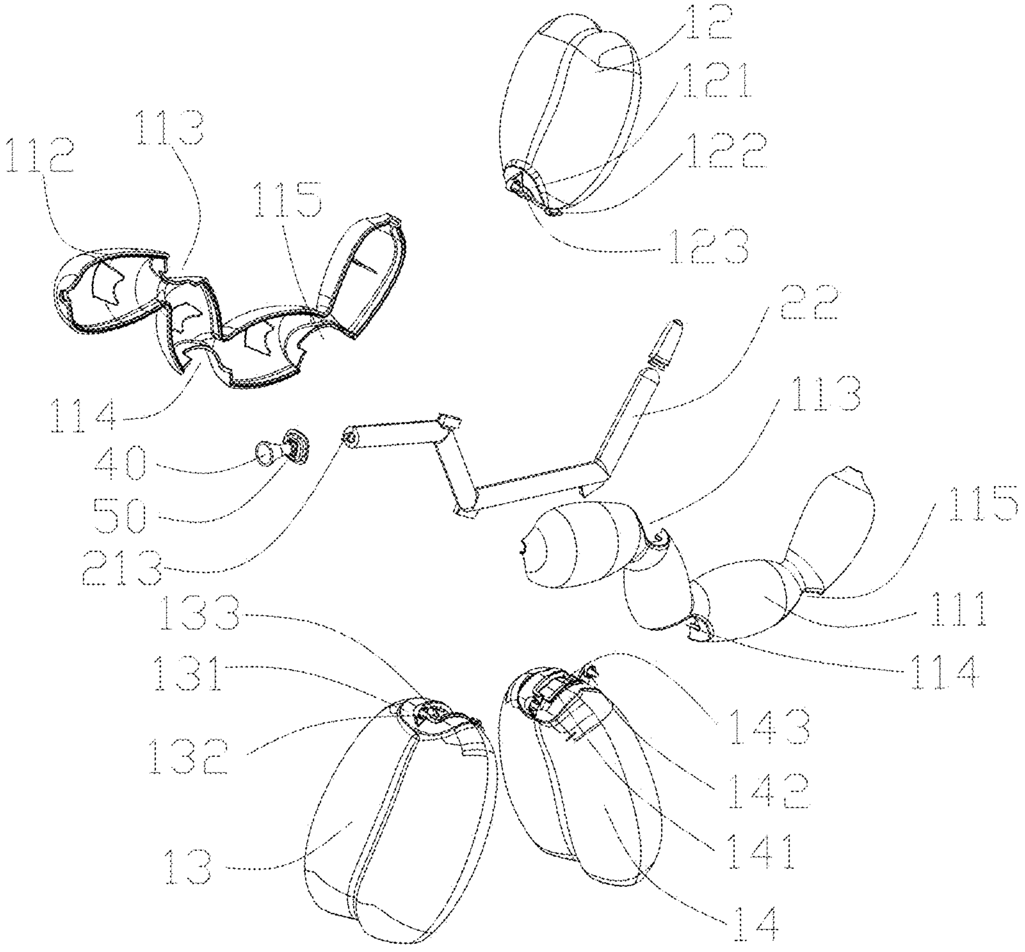
FIG. 4 is an exploded structure diagram of a dog-shaped atmosphere lamp in the present disclosure.
Figure 5:
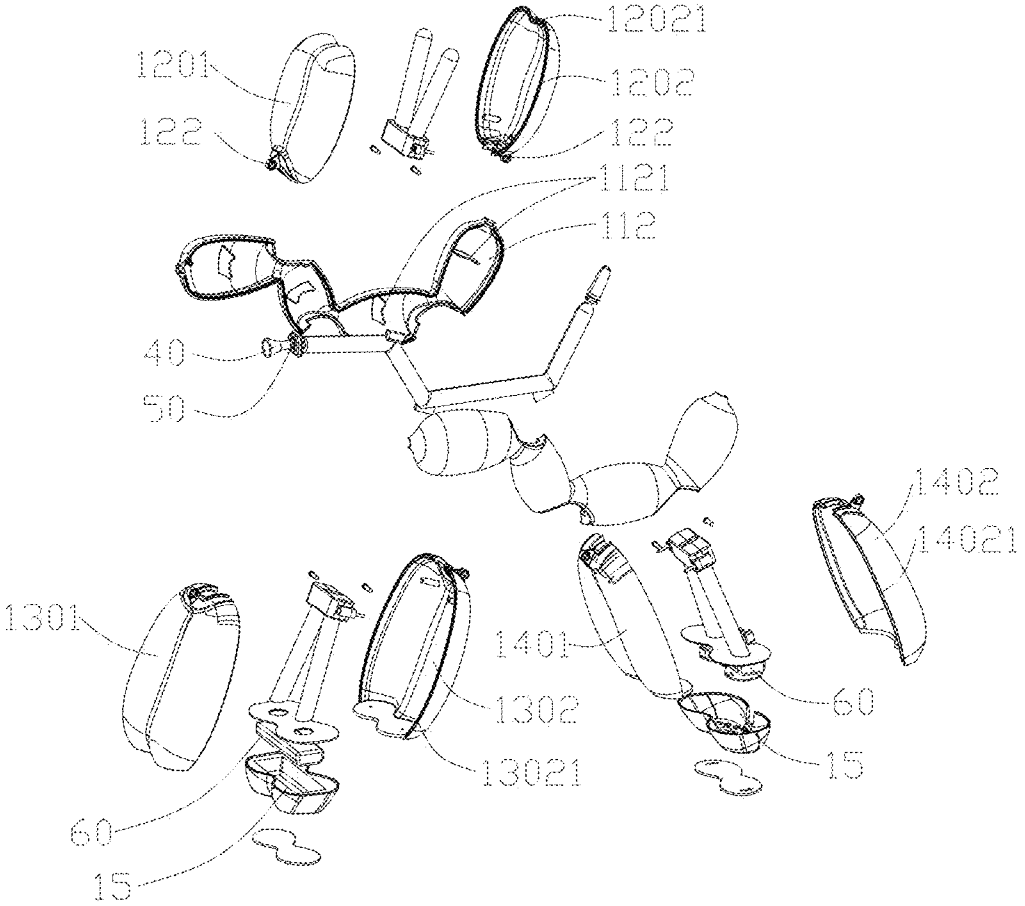
FIG. 5 is an exploded structure diagram of a dog-shaped atmosphere lamp in the present disclosure.
Figure 6:
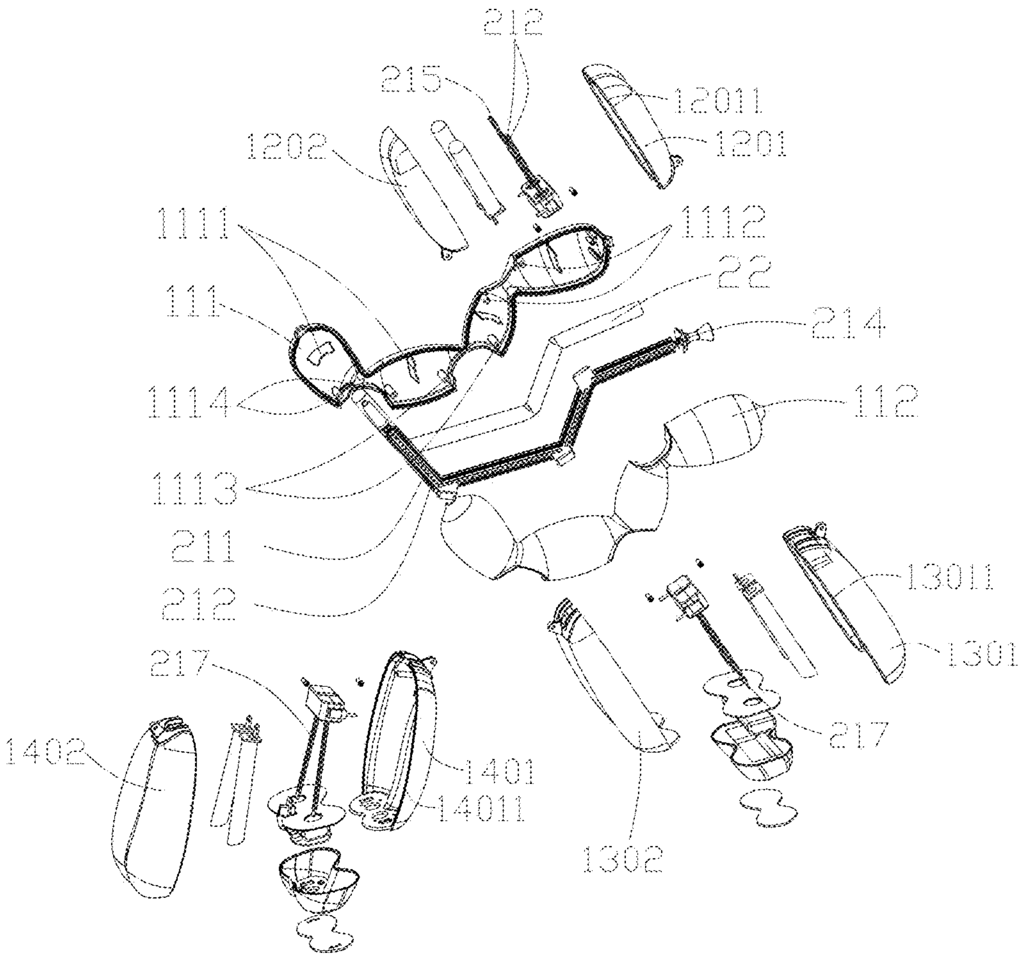
FIG. 6 is an exploded structure diagram of a dog-shaped atmosphere lamp in the present disclosure.
Figure 7:
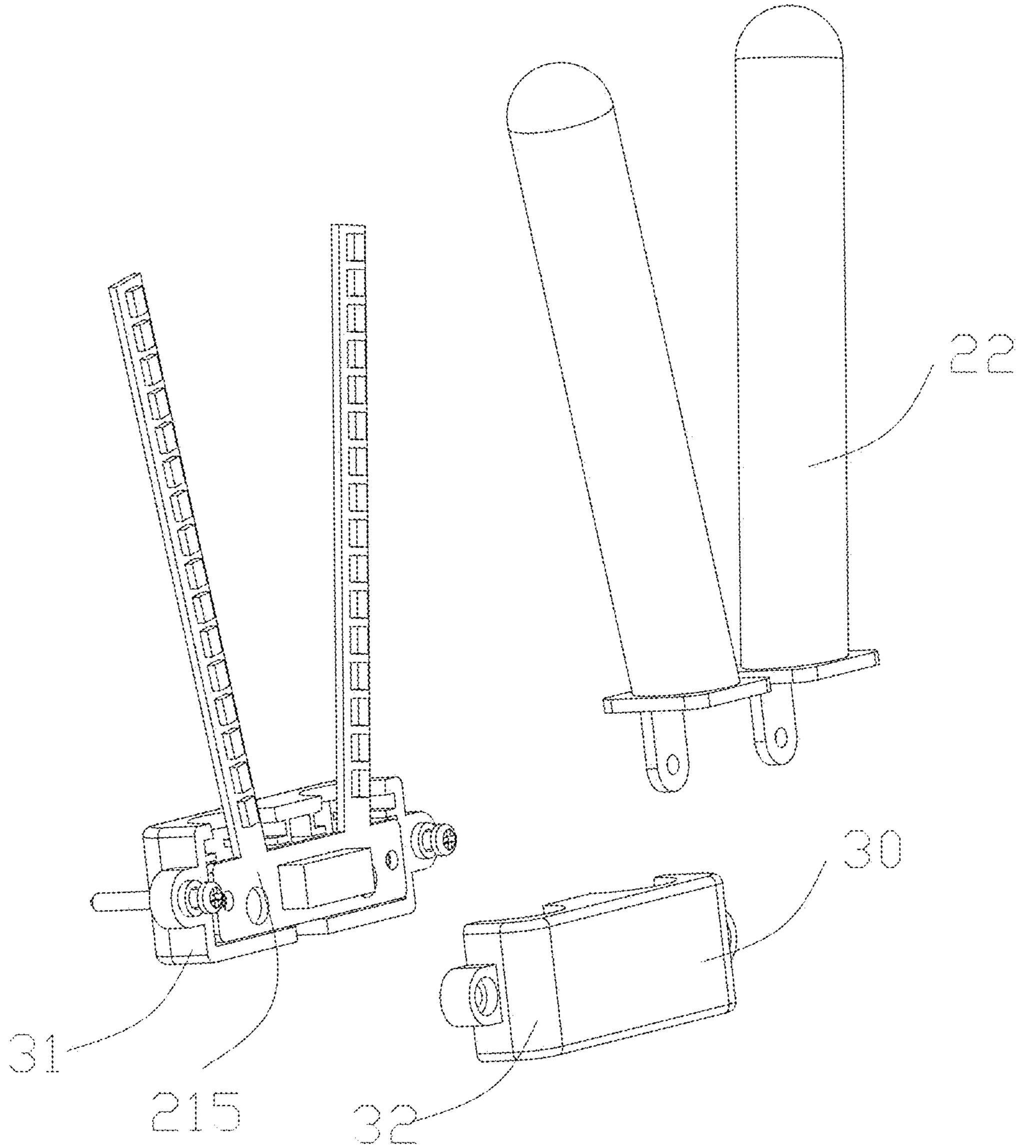
FIG. 7 is an assembly structure diagram of a connecting lamp base of a dog-shaped atmosphere lamp in the present disclosure.

Reference is made to FIG. 1 to FIG. 7. A dog-shaped atmosphere lamp in the present disclosure includes a housing 10 and a light source assembly 20 arranged inside the housing 10, where the housing 10 is a dog-shaped transparent housing; the light source assembly 20 includes one or more lamp panel assemblies 21 and one or more light guide tubes 22 which are arranged inside the housing 10; each of the lamp panel assemblies 21 includes a PCB 211, lamp beads 212 arranged on two sides of the PCB, and a connecting electric wire 213; the lamp beads are arranged on the two sides of the PCB, thereby achieving the 360-degree illumination; and a white coating is provided on a surface of the PCB 211, so that the influence of shadows of other colors is avoided when viewing from the transparent housing, and the relatively uniform illumination is achieved when the outer surface is illuminated. The light guide tube 22 matched with the lamp panel assembly is arranged outside each of the lamp panel assemblies 21, and the PCB 211 and the connecting electric wire 213 are located in the corresponding light guide tube 22, so that the structure inside the housing is simple, the PCB and the connecting electric wire cannot be seen when viewing from the transparent housing, and the appearance is beautiful. In this embodiment, each of the light guide tubes is made of a mixed material of light-transmitting plastic and optical diffusion powder, and a frosted layer is arranged on a surface of the light guide tube. The diffusion powder includes scattering particles such as nano/micron-scale barium sulfate, calcium carbonate, and titanium dioxide, which achieve light diffusion through refraction, reflection, or diffraction, so that the problem of dazzling of a point light source can be eliminated, and uniform light emission can be achieved. The complex appearance is combined with the beautiful appearance.

In this embodiment, the housing 10 includes an integrally formed central chamber 11 arranged corresponding to the head, neck, body and tail of a dog, an ear chamber 12 arranged corresponding to ears of the dog, a foreleg chamber 13 arranged corresponding to forelegs of the dog, and a hind leg chamber 14 arranged corresponding to hind legs of the dog; and each of the lamp panel assemblies 21 includes a main control lamp panel 214 arranged inside the central chamber 11, an ear lamp panel 215 arranged inside the ear chamber 12, a foreleg lamp panel 216 arranged inside the foreleg chamber 13, and a hind leg lamp panel 217 arranged inside the hind leg chamber 14, and the ear lamp panel 215, the foreleg lamp panel 216 and the hind leg lamp panel 217 are respectively connected to the main control lamp panel 214. During mounting, the main control lamp panel 214 is first mounted in the central chamber 11, the ear lamp panel 215 is mounted in the ear chamber 12, the hind leg lamp panel 217 is mounted in the hind leg chamber 14, then the ear lamp panel 215, the foreleg lamp panel 216 and the hind leg lamp panel 217 are respectively connected to the main control lamp panel 214, and then the ear chamber, the foreleg chamber and the hind leg chamber are mounted to the central chamber, so that the entire structure is compact, and is easy and convenient to assemble.

In this embodiment, the ear lamp panel 215, the foreleg lamp panel 216 and the hind leg lamp panel 217 are V-shaped lamp panels, the V-shaped lamp panels are connected to the corresponding housing through connecting lamp bases 30, the V-shaped lamp panels and the light guide tubes corresponding to the V-shaped lamp panels are mounted on the connecting lamp bases 30, and the connecting lamp bases 30 are detachably connected to the corresponding housing. In this embodiment, the connecting lamp base 30 includes a first lamp base housing 31 and a second lamp base housing 32, screw mounting holes are formed in the first lamp base housing and the second lamp base housing, and the first lamp base housing and the second lamp base housing are mounted and fixed to the housing through screws. The V-shaped lamp panels and connecting tubes are respectively connected and fixed to the first lamp base housing or the second lamp base housing through screws. The V-shaped lamp panels are convenient to manufacture and mount, and achieve uniform illumination of light in a specific space by cooperating with the shapes of the ears, forelegs and hind legs of the dog. During specific implementation, the ear lamp panel 215, the foreleg lamp panel 216 and the hind leg lamp panel 217 are not limited to be V-shaped, and may also be linear or annular.

In this embodiment, the central chamber 11 includes a left housing 111 and a right housing 112 which are vertically arranged, the left housing 111 and the right housing 112 are bonded through glue, the main control lamp panel 214 is arranged along the shape of the central chamber, the left housing 111 is provided with a left clamping groove 1111 matched with the light guide tube corresponding to the main control lamp panel 214, the right housing 112 is provided with a right clamping groove 1121 matched with the light guide tube corresponding to the main control lamp panel 214, and the light guide tube corresponding to the main control lamp panel 214 is clamped between the left clamping groove 1111 and the right clamping groove 1121. During mounting, the light guide tube corresponding to the main control lamp panel 214 is clamped between the left clamping groove 1111 and the right clamping groove 1121 while the left housing 111 and the right housing 112 are bonded, so that it is easy and convenient to mount, screws are not needed, and the appearance is beautiful. The ear chamber 12, the foreleg chamber 13 and the hind leg chamber 14 are respectively inserted into the left housing 111 and the right housing 112 to be fixedly connected to the left housing 111 and the right housing 112.

In this embodiment, the left housing 111 is provided with ear chamber mounting columns 1112, foreleg chamber mounting columns 1113, and hind leg chamber mounting columns 1114 in a horizontal direction; the left housing 111 and the right housing 112 are provided with an ear chamber mounting groove 113, a foreleg chamber mounting groove 114, and a hind leg chamber mounting groove 115; an ear chamber mounting portion 121 matched with the ear chamber mounting groove 113 is arranged at the bottom of the ear chamber 12; ear chamber mounting holes 122 matched with the ear chamber mounting columns 1112 are provided in the ear chamber mounting portion 121. In this embodiment, the ear chamber 12 includes a front ear housing 1201 and a rear ear housing 1202, and the front ear housing 1201 and the rear ear housing 1202 are bonded through glue, a rear ear housing dispensing groove 12021 may be provided in the rear ear housing 1202, a front ear housing positioning protrusion 12011 matched with the rear ear housing dispensing groove is arranged on the front ear housing 1201, and then glue is dispensed into the rear ear housing dispensing groove to bond the front ear housing positioning protrusion to the rear ear housing dispensing groove, so that the front ear housing 1201 is connected to the rear ear housing 1202 without screws, and the appearance is beautiful. During mounting of the ear chamber, the ear chamber mounting portion is clamped inside the ear chamber mounting groove, and the ear chamber mounting holes are locked with the ear chamber mounting columns through screws, so that the ear chamber is mounted and fixed to the central chamber. Moreover, no screw is used outside the ear chamber, so that the appearance is beautiful, and the illumination is uniform.

A foreleg chamber mounting portion 131 matched with the foreleg chamber mounting groove 114 is arranged at the top of the foreleg chamber 13; foreleg chamber mounting holes 132 matched with the foreleg chamber mounting columns 1113 are provided in the foreleg chamber mounting portion 131; the foreleg chamber 13 includes a foreleg front housing 1301 and a foreleg rear housing 1302, and the foreleg front housing 1301 and the foreleg rear housing 1302 are bonded through glue; a foreleg rear housing dispensing groove 13021 may be provided in the foreleg rear housing 1302, a foreleg front housing positioning protrusion 13011 matched with the foreleg rear housing dispensing groove is provided on the foreleg front housing 1301, and then glue is dispensed into the foreleg rear housing dispensing groove to bond the foreleg front housing positioning protrusion to the foreleg rear housing dispensing groove, so that the foreleg front housing 1301 is connected to the foreleg rear housing 1302 without screws, and the appearance is beautiful. During mounting of the foreleg chamber, the foreleg chamber mounting portion is clamped inside the foreleg chamber mounting groove, and the foreleg chamber mounting holes are locked with the foreleg chamber mounting columns through screws, so that the foreleg chamber is mounted and fixed to the central chamber. Moreover, no screw is used outside the foreleg chamber, so that the appearance is beautiful, and the illumination is uniform.

A hind leg chamber mounting portion 141 matched with the hind leg chamber mounting groove 115 is arranged at the top of the hind leg chamber 14; and hind leg chamber mounting holes 142 matched with the hind leg chamber mounting columns 1114 are provided in the hind leg chamber mounting portion 141. The hind leg chamber 14 includes a hind leg front housing 1401 and a hind leg rear housing 1402, and the hind leg front housing 1401 and the hind leg rear housing 1402 are bonded through glue. A hind leg front housing dispensing groove 14011 may be provided in the hind leg front housing 1401, a hind leg rear housing positioning protrusion 14021 matched with the hind leg front housing dispensing groove is provided on the hind leg rear housing 1402, and then glue is dispensed into the hind leg front housing dispensing groove to bond the hind leg rear housing positioning protrusion to the hind leg front housing dispensing groove, so that the hind leg front housing 1401 is connected to the hind leg rear housing 1402 without screws, and the appearance is beautiful. During mounting of the hind leg chamber, the hind leg chamber mounting portion is clamped inside the hind leg chamber mounting groove, and the hind leg chamber mounting holes are locked with the hind leg chamber mounting columns through screws, so that the hind leg chamber is mounted and fixed to the central chamber. Moreover, no screw is used outside the hind leg chamber, so that the appearance is beautiful, and the illumination is uniform.

In this embodiment, the ear chamber mounting portion 121 is provided with an ear wire routing hole 123 in communication with the central chamber, and the connecting electric wire is connected to the main control lamp panel 214 through the ear wire routing hole; the foreleg chamber mounting portion 131 is provided with a foreleg wire routing hole 133 in communication with the bottom of the central chamber, and the connecting electric wire is connected to the main control lamp panel 214 through the foreleg wire routing hole; and the hind leg chamber mounting portion 141 is provided with a hind leg wire routing hole 143 in communication with the bottom of the central chamber, and the connecting electric wire is connected to the main control lamp panel 214 through the hind leg wire routing hole; thus, the compact layout is achieved, the overall mounting is easy and convenient, almost no connecting electric wires can be seen from the appearance, and the appearance is beautiful.

In this embodiment, an encoder rotary switch 40 corresponding to the nose of the dog is arranged on a wall of the central chamber 11, a button 50 corresponding to the encoder rotary switch 40 is arranged inside a head chamber, and the encoder rotary switch 40 is clamped with the wall of the central chamber. The encoder rotary switch 40 is clamped with the wall of the central chamber through a snap fastener. The brightness can be adjusted through the encoder rotary switch, the encoder rotary switch is pressed to press the button to control the color of a lamp, and the function of the encoder rotary switch can be set according to function requirements during specific implementation. The arrangement of the encoder rotary switch conforms to ergonomic principles, and it is convenient to operate.

In this embodiment, the dog atmosphere lamp further includes a battery 60, a battery compartment 15 is arranged inside the foreleg chamber 13 and/or the hind leg chamber 14, the battery 60 is located inside the battery compartment 15, and the battery compartment is located at the bottom of the foreleg chamber 13 and/or the bottom of the hind leg chamber 14, so that the overall center of gravity is stable. The battery compartment is fixedly connected to the housing through screws, a charging interface 70 connected to the main control lamp panel 214 is arranged on a wall of the foreleg chamber 13 and/or a wall of the hind leg chamber 14, and the charging interface is used for charging the battery, facilitating the mobile use.

Although the embodiments of the present disclosure are described in detail in conjunction with the accompanying drawings, they should not be understood as limitations on the scope of protection of the present disclosure. Within the scope described in the claims, various amendments and transformations made by a person skilled in the art without involving any inventive effort still fall within the scope of protection of the present disclosure.

What is claimed is:

1. A dog-shaped atmosphere lamp, comprising a housing and a light source assembly arranged inside the housing, wherein the housing is a dog-shaped transparent housing; the light source assembly comprises one or more lamp panel assemblies and one or more light guide tubes which are arranged inside the housing; each of the lamp panel assemblies comprises a PCB, lamp beads arranged on two sides of the PCB, and a connecting electric wire, and a white coating is provided on a surface of the PCB; the light guide tube matched with the lamp panel assembly is arranged outside each of the lamp panel assemblies; and the PCB and the connecting electric wire are located in the corresponding light guide tube.

2. The dog-shaped atmosphere lamp according to claim 1, wherein the housing comprises an integrally formed central chamber arranged corresponding to the head, neck, body and tail of a dog, an ear chamber arranged corresponding to ears of the dog, a foreleg chamber arranged corresponding to forelegs of the dog, and a hind leg chamber arranged corresponding to hind legs of the dog; and each of the lamp panel assemblies comprises a main control lamp panel arranged inside the central chamber, an ear lamp panel arranged inside the ear chamber, a foreleg lamp panel arranged inside the foreleg chamber, and a hind leg lamp panel arranged inside the hind leg chamber, and the ear lamp panel, the foreleg lamp panel and the hind leg lamp panel are respectively connected to the main control lamp panel.

3. The dog-shaped atmosphere lamp according to claim 2, wherein the ear lamp panel, the foreleg lamp panel and the hind leg lamp panel are V-shaped lamp panels, the V-shaped lamp panels are connected to the corresponding housing through connecting lamp bases, the V-shaped lamp panels and the light guide tubes corresponding to the V-shaped lamp panels are mounted on the connecting lamp bases, and the connecting lamp bases are detachably connected to the corresponding housing.

4. The dog-shaped atmosphere lamp according to claim 2, wherein an encoder rotary switch corresponding to the nose of the dog is arranged on a wall of the central chamber, a button corresponding to the encoder rotary switch is arranged inside a head chamber, and the encoder rotary switch is clamped with the wall of the central chamber.

5. The dog-shaped atmosphere lamp according to claim 2, further comprising a battery, wherein a battery compartment is arranged inside the foreleg chamber and/or the hind leg chamber, the battery is located inside the battery compartment, and a charging interface connected to the main control lamp panel is arranged on a wall of the foreleg chamber and/or a wall of the hind leg chamber.

6. The dog-shaped atmosphere lamp according to claim 2, wherein the central chamber comprises a left housing and a right housing which are vertically arranged, the left housing and the right housing are bonded through glue, the main control lamp panel is arranged along the shape of the central chamber, the left housing is provided with a left clamping groove matched with the light guide tube corresponding to the main control lamp panel, the right housing is provided with a right clamping groove matched with the light guide tube corresponding to the main control lamp panel, the light guide tube corresponding to the main control lamp panel is clamped between the left clamping groove and the right clamping groove, and the ear chamber, the foreleg chamber and the hind leg chamber are respectively inserted into the left housing and the right housing to be fixedly connected to the left housing and the right housing.

7. The dog-shaped atmosphere lamp according to claim 6, wherein the left housing is provided with ear chamber mounting columns, foreleg chamber mounting columns, and hind leg chamber mounting columns in a horizontal direction; the left housing and the right housing are provided with an ear chamber mounting groove, a foreleg chamber mounting groove, and a hind leg chamber mounting groove; an ear chamber mounting portion matched with the ear chamber mounting groove is arranged at the bottom of the ear chamber; ear chamber mounting holes matched with the ear chamber mounting columns are provided in the ear chamber mounting portion; a foreleg chamber mounting portion matched with the foreleg chamber mounting groove is arranged at the top of the foreleg chamber; foreleg chamber mounting holes matched with the foreleg chamber mounting columns are provided in the foreleg chamber mounting portion; a hind leg chamber mounting portion matched with the hind leg chamber mounting groove is arranged at the top of the hind leg chamber; and hind leg chamber mounting holes matched with the hind leg chamber mounting columns are provided in the hind leg chamber mounting portion.

8. The dog-shaped atmosphere lamp according to claim 7, wherein the ear chamber mounting portion is provided with an ear wire routing hole in communication with the central chamber; the foreleg chamber mounting portion is provided with a foreleg wire routing hole in communication with the bottom of the central chamber; and the hind leg chamber mounting portion is provided with a hind leg wire routing hole in communication with the bottom of the central chamber.

9. The dog-shaped atmosphere lamp according to claim 6, wherein the ear chamber comprises a front ear housing and a rear ear housing, and the front ear housing and the rear ear housing are detachably connected through screws; the foreleg chamber comprises a foreleg front housing and a foreleg rear housing, and the foreleg front housing and the foreleg rear housing are connected through screws; and the hind leg chamber comprises a hind leg front housing and a hind leg rear housing, and the hind leg front housing and the hind leg rear housing are connected through screws.

10. The dog-shaped atmosphere lamp according to claim 1, wherein each of the light guide tubes is made of a mixed material of light-transmitting plastic and optical diffusion powder, and a frosted layer is arranged on a surface of the light guide tube.

* * * * *